US007013111B2

(12) United States Patent
Kuwahara et al.

(10) Patent No.: US 7,013,111 B2
(45) Date of Patent: Mar. 14, 2006

(54) WIRELESS COMMUNICATION APPARATUS

(75) Inventors: Mikio Kuwahara, Hachioji (JP); Kenichi Mizugaki, Kokubunji (JP); Atsushi Ogino, Kodaira (JP); Kenzaburo Fujishima, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 455 days.

(21) Appl. No.: 10/206,047

(22) Filed: Jul. 29, 2002

(65) Prior Publication Data

US 2003/0162550 A1 Aug. 28, 2003

(30) Foreign Application Priority Data

Feb. 26, 2002 (JP) .......................... P2002-049447

(51) Int. Cl.
*H04B 7/15* (2006.01)

(52) U.S. Cl. ...................... 455/11.1; 455/18; 455/456.1

(58) Field of Classification Search ................ 455/457, 455/456, 11.1, 423, 67.6, 18; 375/213; 370/241
See application file for complete search history.

(56) References Cited

U.S. PATENT DOCUMENTS 6,132,306 A * 10/2000 Trompower ................ 455/11.1
6,633,743 B1 * 10/2003 Berlinsky .................. 455/11.1
2001/0036833 A1 * 11/2001 Koshima et al. ............ 455/457
2002/0115448 A1 * 8/2002 Amerga et al. ............. 455/456
2003/0125045 A1 * 7/2003 Riley et al. ................. 455/456

FOREIGN PATENT DOCUMENTS

JP 07-181242 12/1993

* cited by examiner

*Primary Examiner*—Sonny Trinh
*Assistant Examiner*—Phuoc Doan
(74) *Attorney, Agent, or Firm*—Reed Smith LLP; Stanley P. Fisher, Esq.; Juan Carlos A. Marquez, Esq.

(57) ABSTRACT

The disclosed invention provides a wireless communications terminal apparatus that calculates its accurate position, eliminating the influence of a repeater on the calculation without using complicated processing. The terminal apparatus receives signals transmitted from a plurality of radio stations and calculates its position, using the received signals. The terminal apparatus comprises repeater detection means for detecting a signal from a repeater which transmits signals that are generated on the basis of signals transmitted from one of the radio stations and indistinguishable from the signals transmitted from that radio station from among the received signals and position calculation means for calculating its position. When the repeater detection means has detected a signal from a repeater, the position calculation means ignores the detected signal from the repeater and calculates the terminal position, using the received signals from other radio stations.

18 Claims, 10 Drawing Sheets

EQUATIONS $$\sqrt{(x1-x)^2+(y1-y)^2}-\sqrt{(x2-x)^2+(y2-y)^2}=(T1-T2)C$$

$$\sqrt{(x3-x)^2+(y3-y)^2}-\sqrt{(x2-x)^2+(y2-y)^2}=(T3-T2)C$$

C: VELOCITY OF LIGHT

WIRELESS COMMUNICATION APPARATUS

BACKGROUND OF THE INVENTION

1. Field of the Invention

The present invention relates a wireless communications terminal apparatus which is able to determine its present position, using radio frequency signals, and, more particularly, to such apparatus capable of accurate calculation of its position even when it is in the vicinity of a repeater.

2. Description of Related Art

Techniques for determining the position of a wireless communications terminal apparatus (mobile station), using signals transmitted from base stations in a mobile communications system have so far been proposed. For example, such a technique was proposed in JP-A No. 181242/1995 that the position of a mobile terminal is determined by using the positions of base stations and difference of propagation delay time of signals transmitted from the base stations to the terminal in a code division multiple access (CDMA) system.

Referring to FIG. 2, the above technique is explained. A mobile station MS receives signals from three base stations existing in its periphery performs correlation processing of the received signals, and determines timing of each signal reception. From the determined timing of each signal reception, delay time difference of signal reception timing from the base stations (in proportion to difference in distance of the mobile station from the base stations) is calculated. Using the thus calculated delay time difference, by evaluating the equations given in FIG. 2, the position of the mobile station can be obtained.

In a conventional mobile communications system in which the above-explained technique is applied, a repeater (RP) that receives signals from a particular base station BS1 and retransmits the signals is installed in addition to the base stations as is shown in FIG. 3. Such repeater is capable of extending the area within which cellular communications can be implemented with less cost. Thus, repeaters are widely used, especially for extending indoor service areas. However, the repeater RP receives signals transmitted by the particular base station BS1 and transmits the signals as is. Therefore, the repeater RP transmits the same signals as those that the base station BS1 transmits. The time of receiving a signal transmitted by the repeater is later than the time of receiving the signal directly transmitted from the base station BS1 due to signal processing on the repeater. A chart presented at the top of the page of FIG. 3 shows a delay profile of measured time of signal reception from the repeater in a wireless communications system in practical use. PN0 is a signal from the base station nearest to the mobile station and a correlation value representing intensive power of the signal is obtained. PN1 is a signal from the base station BS1; the signal being repeated by the repeater RP connected to the BS1. Timing when the mobile station MS would receive the signal directly from BS1 on the supposition that the signal is not repeated is marked with a dotted line in the chart.

When the mobile station comes near the repeater, it receives a signal of large delay repeated by the repeater. From the chart of the PN1 signal, it is seen that the mobile station receives the signal repeated by the repeater with delay equivalent to 12 km longer than the distance between the BS1 and the mobile station MS which would otherwise be calculated from the assumed time of reception of the signal directly transmitted from the BS1. Position calculation of the mobile station using the repeated signal results in a mobile station position with quite a large error.

Briefly, problems of the conventional method in which a wireless communications terminal (mobile station) determines its position are that we have had:

(1) No method of detecting a repeater; and (2) No method of mitigating the influence of the repeater on the terminal position determination even if the repeater was detected by some means or other.

SUMMARY OF THE INVENTION

The object of the present invention is to provide a wireless communications terminal apparatus that calculates its accurate position, mitigating the influence of a repeater on the calculation without using complicated processing.

In order to solve the above-noted problems, the present invention in one aspect provides a wireless communications terminal apparatus which receives signals transmitted from a plurality of radio stations and calculates its position, using the received signals. This terminal apparatus comprises repeater detection means for detecting a signal from a repeater which transmits signals that are generated on the basis of signals transmitted from one of the radio stations and indistinguishable from the signals transmitted from that radio station from among the received signals and position calculation means for calculating its position. When the repeater detection means has detected a signal from a repeater, the position calculation means ignores the detected signal from the repeater and calculates the terminal position, using the received signals from other radio stations.

In another aspect, the invention provides a wireless communications terminal apparatus which receives signals transmitted from a plurality of radio stations and calculates its position by using the received signals, comprising repeater detection means for detecting a signal from a repeater which transmits signals that are generated on the basis of signals transmitted from one of the radio stations and indistinguishable from the signals transmitted from that radio station from among the received signals and position calculation means for calculating its position, wherein, when the repeater detection means has detected a signal from a repeater, the position calculation means determines the location of the repeater transmitting the detected signal as the position of the terminal apparatus.

In yet another aspect, the invention provides a system for determining terminal position, comprising the following: radio stations which transmit signals to a wireless communications terminal apparatus; a repeater which transmits signals that are generated on the basis of signals transmitted from one of the radio stations and indistinguishable from the signals transmitted from that radio station; a wireless communications terminal apparatus which receives signals from a plurality of radio stations for calculating its position, using the received signals; repeater detection means for detecting a signal from the repeater from among the received signals; and position calculation means for calculating the position of the terminal apparatus, wherein, when the repeater detection means has detected a signal from a repeater, the position calculation means ignores the detected signal from the repeater and calculates the position of the terminal apparatus, using the received signals from other radio stations.

In yet another aspect, the invention provides a system for determining terminal position, comprising the following: radio stations which transmit signals to a wireless communications terminal apparatus; a repeater which transmits signals that are generated on the basis of signals transmitted from one of the radio stations and indistinguishable from the signals transmitted from that radio station; a wireless communications terminal apparatus which receives signals from a plurality of radio stations for calculating its position, using the received signals; repeater detection means for detecting a signal from the repeater from among the received signals; and position calculation means for calculating the position of the terminal apparatus, wherein, when the repeater detection means has detected a signal from a repeater, the position calculation means determines the location of the repeater transmitting the detected signal as the position of the terminal apparatus.

In a further aspect, the invention provides a position calculation method by which a wireless communications terminal apparatus receives signals transmitted from a plurality of radio stations and calculates its position, using the received signals. The position calculation method comprises a repeater detection step for detecting a signal from a repeater which transmits signals that are generated on the basis of signals transmitted from one of the radio stations and indistinguishable from the signals transmitted from that radio station from among the received signals and a position calculation step for calculating the position of the terminal apparatus, wherein, when a signal from a repeater has been detected by the repeater detection step, the detected signal from the repeater is ignored and the position of the terminal apparatus is calculated by using the received signals from other radio stations in the position calculation step.

In a still further aspect, the invention provides a position calculation method by which a wireless communications terminal apparatus receives signals transmitted from a plurality of radio stations and calculates its position, using the received signals, the position calculation method comprising a repeater detection step for detecting a signal from a repeater which transmits signals that are generated on the basis of signals transmitted from one of the radio stations and indistinguishable from the signals transmitted from that radio station from among the received signals and a position calculation step for calculating the position of the terminal apparatus, wherein, when a signal from a repeater has been detected by the repeater detection step, the location of the repeater transmitting the detected signal is determined as the position of the terminal apparatus in the position calculation step.

In a further aspect, the invention provides a server apparatus which is used in the above system for determining terminal position to calculate the position of a wireless communications terminal apparatus which received signals from a plurality of radio stations. The server apparatus comprises position calculation means for calculating the position of the terminal apparatus, based on timing when the wireless communications terminal apparatus received the signals, and repeater detection means for detecting a signal from a repeater which transmits signals that are generated on the basis of signals transmitted from one of the radio stations and indistinguishable from the signals transmitted from that radio station from among the received signals, wherein, when the repeater detection means has detected a signal from a repeater, the position calculation means ignores the detected signal from the repeater and calculates the position of the terminal apparatus, using the received signals from other radio stations.

In a still further aspect, the invention provides a server apparatus which calculates the position of a wireless communications terminal apparatus which received signals from a plurality of radio stations, the server apparatus comprising position calculation means for calculating the position of the terminal apparatus, based on timing when the wireless communications terminal apparatus received the signals, and repeater detection means for detecting a signal from a repeater which transmits signals that are generated on the basis of signals transmitted from one of the radio stations and indistinguishable from the signals transmitted from that radio station from among the received signals, wherein, when the repeater detection means has detected a signal from a repeater, the position calculation means determines the location of the repeater transmitting the detected signal as the position of the terminal apparatus.

In a further aspect, the invention provides an apparatus fabricated with semiconductor integrated circuits, which is used as the above wireless communications terminal apparatus, having a memory into which a program can be stored and a CPU, wherein a computer-executable program is stored into the memory and the CPU executes the program stored and retained in the memory. The program comprises a repeater detection step for detecting a signal from a repeater which transmits signals that are based on signals transmitted from one of the radio stations and indistinguishable from the signals transmitted from that radio station from among the received signals and a position calculation step for calculating the position of the terminal apparatus, wherein, when a signal from a repeater has been detected by the repeater detection step, the detected signal from the repeater is ignored and the position of the terminal apparatus is calculated by using the received signals from other radio stations in the position calculation step.

In a still further aspect, the invention provides an apparatus fabricated with semiconductor integrated circuits having a memory into which a program can be stored and a CPU, wherein a computer-executable program is stored into the memory and the CPU executes the program stored and retained in the memory. The program comprises a repeater detection step for detecting a signal from a repeater which transmits signals that are generated on the basis of signals transmitted from one of the radio stations and indistinguishable from the signals transmitted from that radio station from among the received signals and a position calculation step for calculating the position of the terminal apparatus, wherein, when a signal from a repeater has been detected by the repeater detection step, the location of the repeater transmitting the detected signal is determined as the position of the terminal apparatus in the position calculation step.

In order to solve the above-noted problems and in accordance with one implementation of the invention, a wireless communications terminal apparatus which receives signals transmitted from a plurality of radio stations and calculates its position by using the received signals comprises repeater detection means for detecting a signal from a repeater which transmits signals that are generated on the basis of signals transmitted from one of the radio stations and indistinguishable from the signals transmitted from that radio station from among the received signals and position calculation means for calculating its position, wherein, when the repeater detection means has detected a signal from a repeater, the position calculation means determines the location of the repeater transmitting the detected signal as the position of the terminal apparatus. Thus, accurate terminal position determination can be carried out even in a wireless cellular communications system in which repeaters exist, and only slight change is required for implementing that.

According to another implementation of the invention, a wireless communications terminal apparatus which receives signals transmitted from a plurality of radio stations and calculates its position by using the received signals comprises repeater detection means for detecting a signal from a repeater which transmits signals that are generated on the basis of signals transmitted from one of the radio stations and indistinguishable from the signals transmitted from that radio station from among the received signals and position calculation means for calculating its position, wherein, when the repeater detection means has detected a signal from a repeater, the position calculation means determines the location of the repeater transmitting the detected signal as the position of the terminal apparatus. Because repeaters are intended to cover a small area such as indoor space, they are characterized in that their transmitting power is generally lower than the transmitting power of other base stations. When the terminal receives the most powerful signals from a possible repeater in comparison with the signals from other base stations, it is reasonable to consider that the terminal is very near to the repeater. Thus, accurate terminal position determination can be carried out even in a wireless cellular communications system in which repeaters exist.

The above-mentioned repeater detection means compares timing of receiving a signal from one radio station and timing of receiving a signal from another radio station and determines that one radio station is a repeater, based on the result of the comparison (for example, when the timing of receiving the signal from one radio station is later than the timing of receiving the signal from another radio station by a predetermine time and longer) . Thus, repeater detection can be carried out without using a complicated method.

When the terminal apparatus can observe signals only in a predetermined number of sectors from one of the radio stations, the above-mentioned repeater detection means determines that the one of the radio stations is a repeater. Normally, a cellular base station transmits signals in multiple sectors. When the terminal is very near to a base station, it observes signals in a plurality of sectors transmitted from the base station. However, a repeater repeats only one of the plurality of sectors transmitted from a base station. When the terminal is very near to a repeater, in most cases, it observes signals in one of the plurality of sectors. Thus, repeater detection can be carried out without using a complicated method.

BRIEF DESCRIPTION OF THE DRAWINGS

The invention will be more particularly described with reference to the accompanying drawings, in which.

DETAILED DESCRIPTION OF THE PREFERRED EMBODIMENTS

The present invention now is described fully hereinafter with reference to the accompanying drawings, in which preferred embodiments of the invention are shown.

Figure 1:
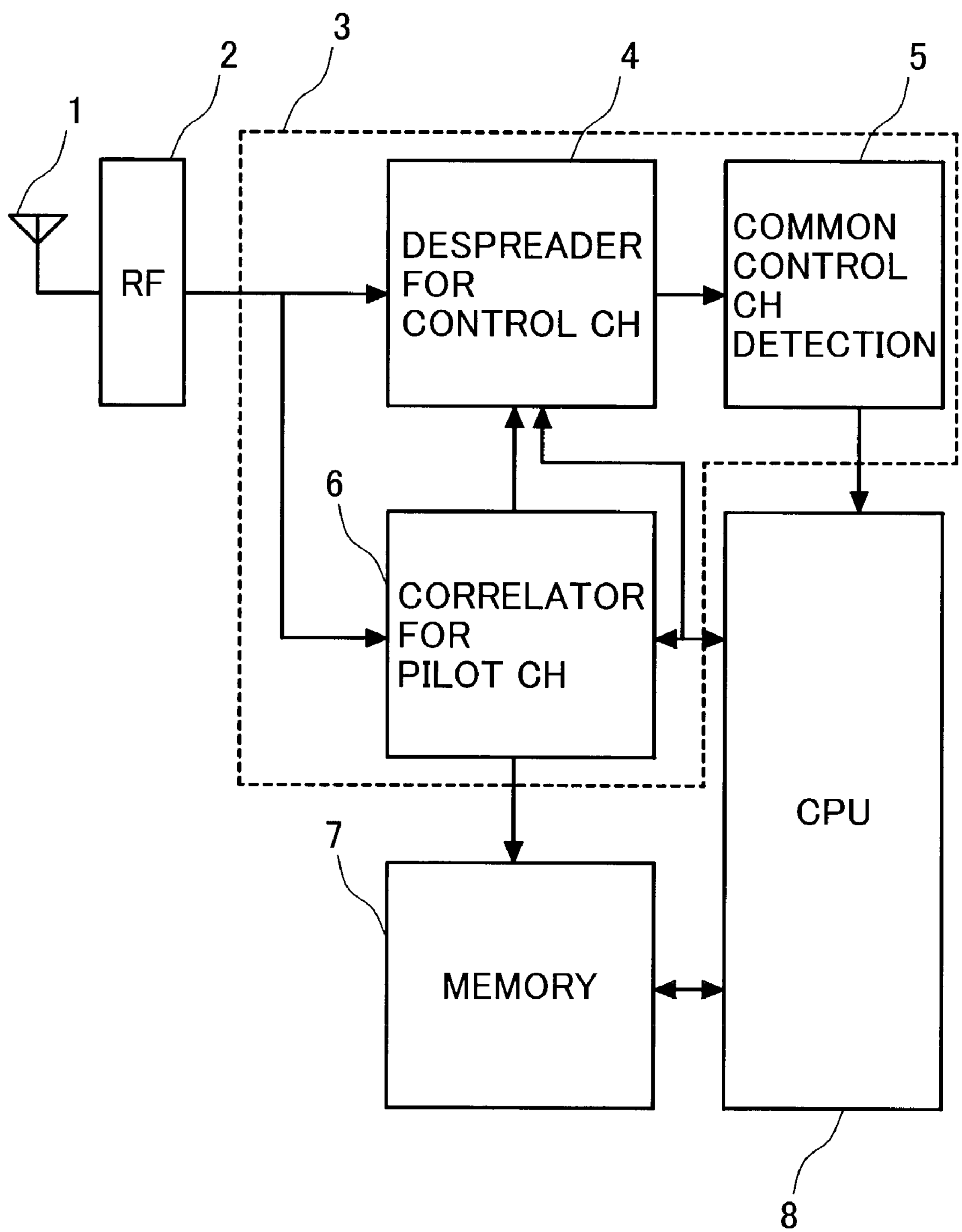
FIG. 1 is a block diagram showing the configuration of a wireless communications terminal apparatus according to a preferred embodiment of the present invention.

FIG. 1 is a block diagram showing the configuration of a wireless communications terminal apparatus according to a preferred embodiment of the present invention.

The wireless communications terminal apparatus according to this embodiment of the invention is essentially comprised of an antenna 1, RF unit 2, baseband unit 3, storage 7, and CPU 8. The baseband unit 3 comprises a despreader 4, detection block 5, and correlator 6. Signals from base stations are received by the antenna 1 and transferred to the RF unit 2. The RF unit 2 consists of a receiving portion and a transmitting portion. The RF unit 2 performs receive processing such as amplification at high and intermediate frequencies and frequency conversion for the signals from the base stations, received by the antenna 1, and converts them to baseband signals.

The procedure in which the wireless communications terminal apparatus of this embodiment carries out its position calculation will be explained below. Assume that the terminal is communicating with base stations in a TIA/EIA/IS-95 system which is a cellular system using CDMA. In the TIA/EIA/IS-95 system, the base stations transmit pilot signals of a fixed pattern. Each base station transmits a pilot signal at timing based on PN offset predetermined for each base station, behind the system clock. The terminal first determines what base station is the nearest to it. To do this, the correlator 6 for pilot channels operates for seeking timing when the highest correlation peak occurs as the phase of pilot signals supplied to the correlator changes sequentially. The thus detected peak position is timing in synchronization with signal reception from the base station regarded as the nearest to the terminal.

Figure 2:
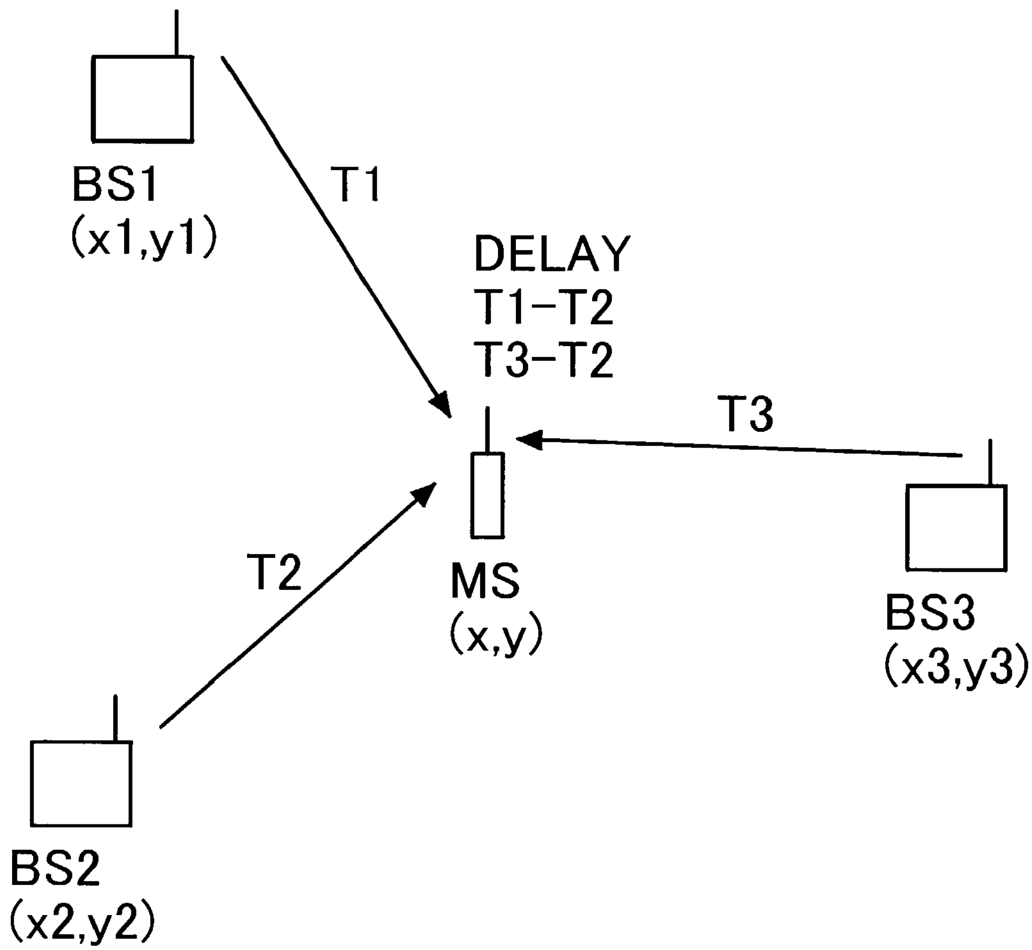
FIG. 2 is a schematic drawing that explains the principle of locating the wireless communications terminal apparatus according to a preferred embodiment of the present invention.

The baseband unit 3 includes the despreader 4 for control channels. The despreader 4 performs despread processing at the detected timing of signal reception from the base station nearest to the terminal and control channel signals are picked out. The picked out control channel signals are detected by the detection block 5 and demodulated into significant information. The CPU 8 extracts the ID of the base station from which the terminal is receiving the signals from the thus picked up signals. The CPU 8 looks through an information table for base stations in the periphery of the terminal, which has been stored into the memory 7 beforehand, and gets the PN offsets of the base stations in the vicinity of the terminal. With regard to timing based on the PN offsets of the base station nearest to the terminal and other base stations in the vicinity of the terminal, a delay profile is created, using the correlator 6 for pilot signals. The thus created delay profile is stored into the storage 7. The CPU 8 analyzes the delay profile stored in the storage 7 and picks up timing when a direct wave propagation path from each base station in the vicinity of the terminal has been detected. The picked up timings for each base station correspond to propagation time T1, T2, and T3 of direct waves from each base station in the terminal (mobile station), which are shown in FIG. 2. Furthermore, the CPU 8 evaluates the equations given in FIG. 2, using the method of least squares, thus calculating the position of the terminal (mobile station). For this position calculation, the IDs, PN offsets, and positions of the base stations are necessary, which must be stored into the memory of the terminal beforehand.

FIG. 2 is a schematic drawing that explains the principle of locating the wireless communications terminal apparatus according to the preferred embodiment of the invention.

The terminal (mobile station) MS receives signals from three base stations BS1, BS2, and BS3 in the vicinity of the MS. Each base station has time in synchronization with a GPS or network and all base stations that belong to the radio communications system have a synchronized precise clock. Each base station transmits signals of a fixed pattern controlled in synchronization with the clock. The terminal (mobile station) MS knows beforehand the signal pattern to be transmitted from each station and the correlator performs correlation processing between the pattern and the received signals and detects timing of signal reception from each base station. From the detected timing, the timings of signal reception from the base stations BS1, BS2, and BS3 are determined as T1, T2, and T3. Time difference by signal reception delay from each base station, that is, T1 minus T2 and T3 minus T2 are calculated. Because this delay time difference is proportional to difference in distance of the terminal from the base stations, by evaluating the equations given in FIG. 2 by using the method of least squares, the terminal position (x, y) can be obtained.

Particularly in the CDMA cellular system, because three base stations transmit signals, using the same frequency band, the terminal (mobile station) MS can receive signals from the three base stations simultaneously by observing only one frequency and changing the signal pattern to watch.

Figure 3:
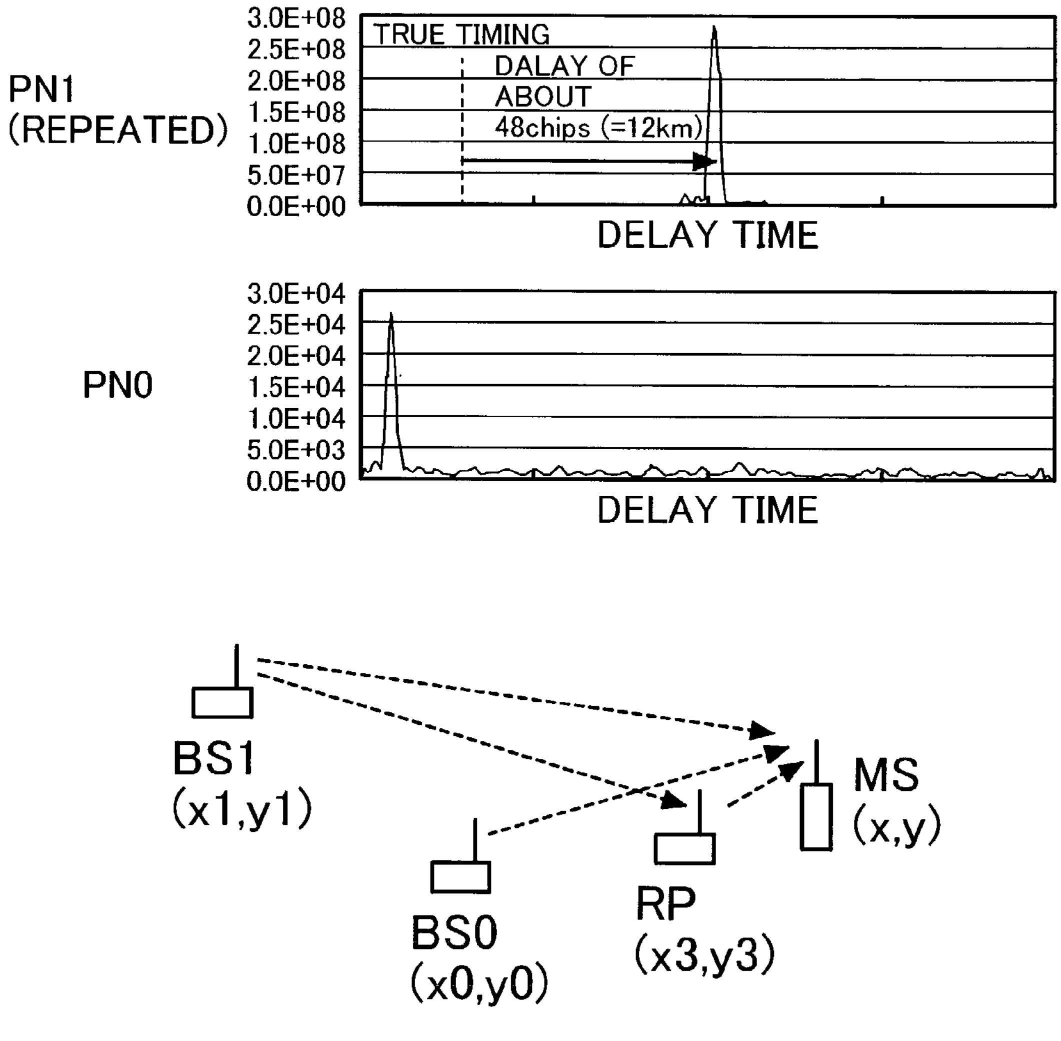
FIG. 3 shows delay profiles of measured signals received from a plurality of stations when the terminal (mobile station) is near a repeater.

FIG. 3 shows delay profiles of measured signals received from a plurality of stations when the MS is near a repeater.

As described in the "Description of Related Art" part of this specification, a delayed signal from the repeater RP is received as the signal of more intensive power than the signal directly transmitted from the base station BS1. If the signal from the repeater is used as is for position calculation, this considerably delayed signal causes a large error of the terminal position obtained as the solution of the equations for position calculation (FIG. 2), that is, the obtained position is largely off the true position of the terminal.

Figure 4:
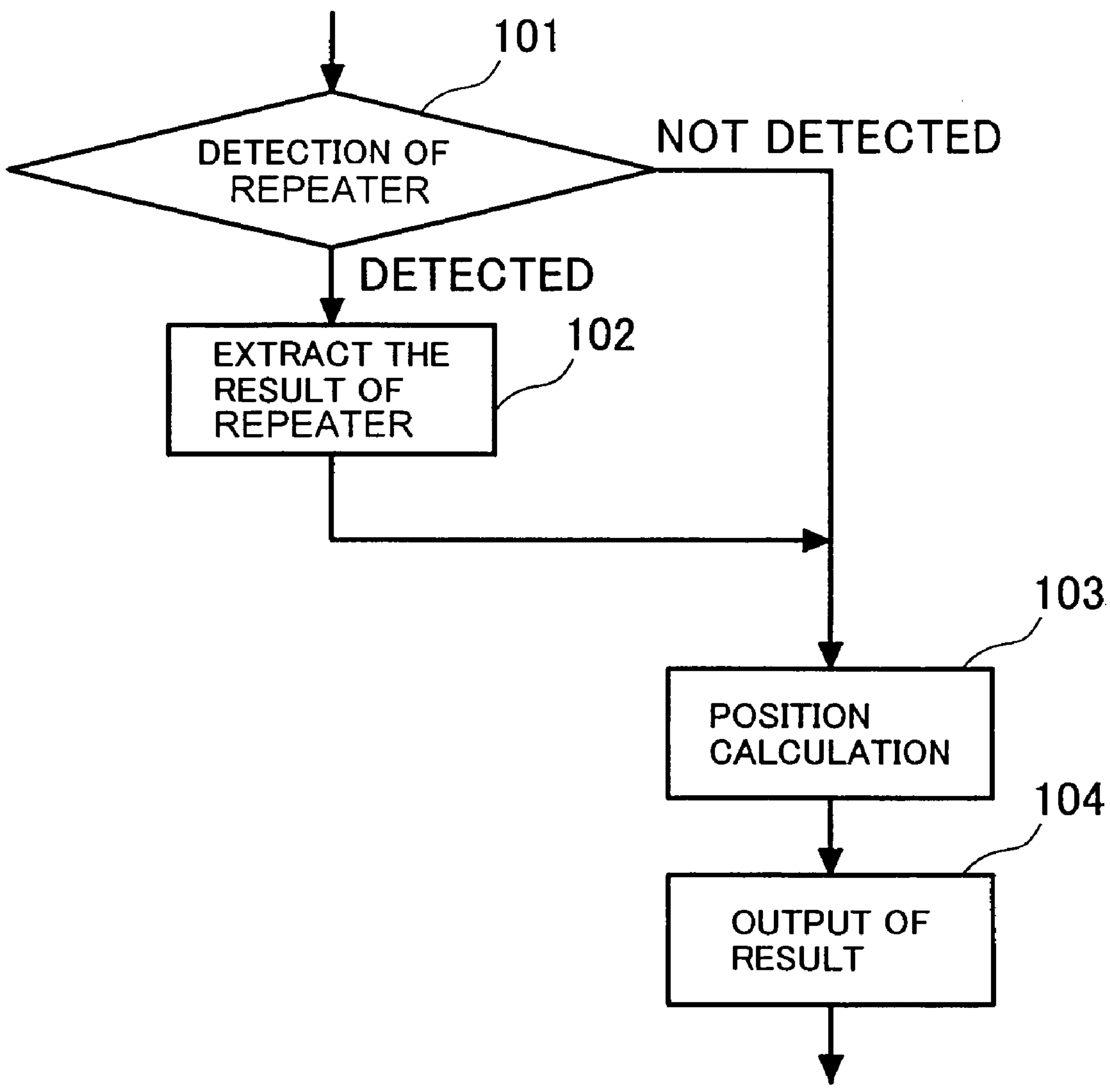
FIG. 4 is a flowchart illustrating a position calculation method of Embodiment 1.

FIG. 4 is a flowchart illustrating a position calculation method (Embodiment 1) that is implemented by the wireless communications terminal apparatus of an embodiment of the invention. This flowchart illustrates the above method that is applied to, particularly, such terminal apparatus including means for detecting a repeater.

Prior to position calculation, the terminal determines whether a repeater or a base station from which it received the signals (101) If a repeater is detected, the terminal removes distance measurement obtained as the result of measuring delay time of the signals from the repeater (102). Then, the terminal calculates its position (103). Unless a repeater is detected, the terminal calculates its position, using distance measurements obtained as the result of measuring delay time of the signals from all base stations in its vicinity (103). The calculated terminal position is output (104).

The algorithm for detecting a repeater and removing the distance measurement of the repeater is very simple and its addition does not severely increase the position calculation load on the terminal. Therefore, the influence of a repeater on position calculation can be removed by simple decision.

A repeater detection method will then be explained.

Figure 5:
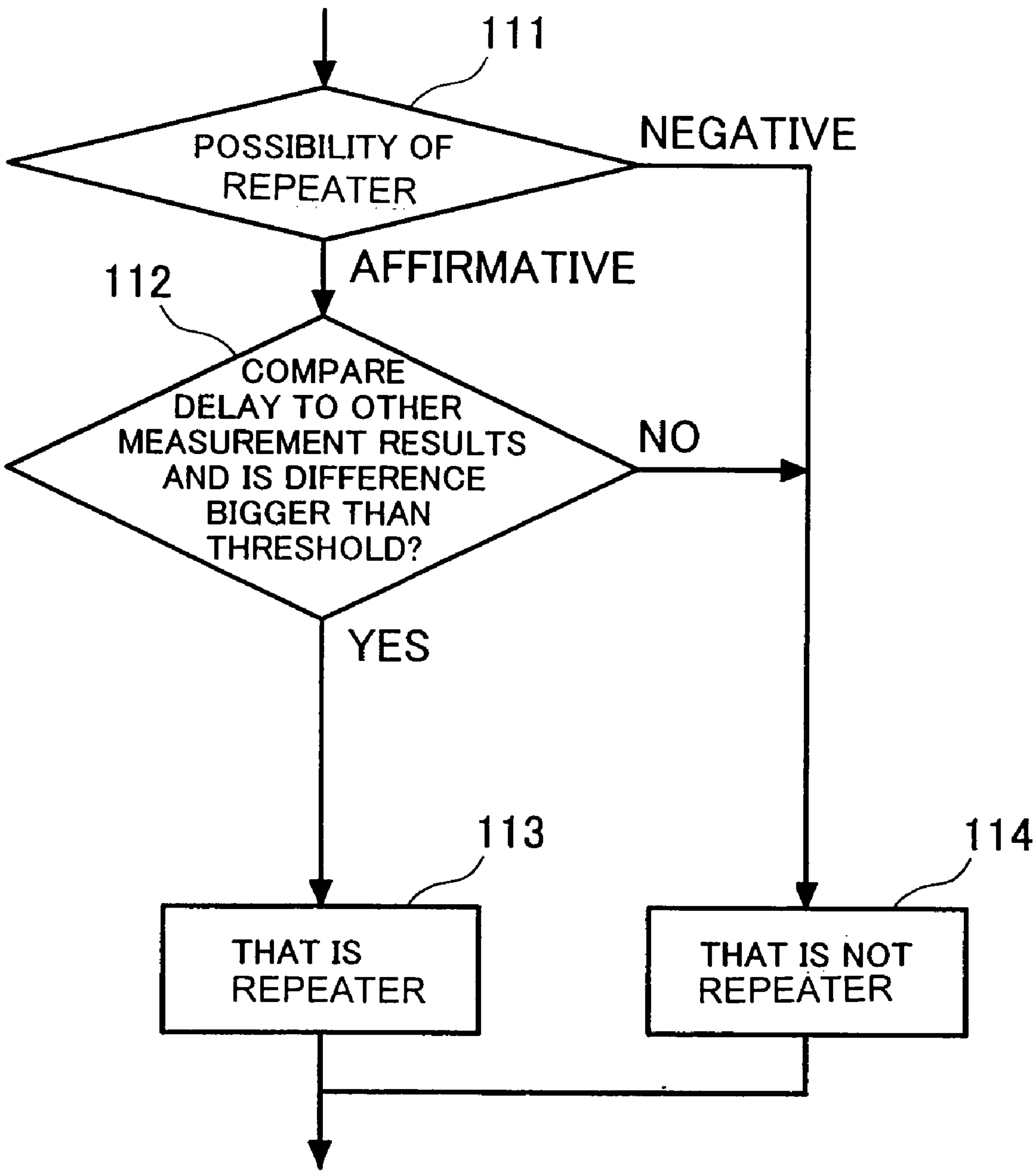
FIG. 5 is a flowchart illustrating a repeater detection method of Embodiment 1.

FIG. 5 is a flowchart illustrating the repeater detection method applicable to Embodiment 1 of the invention.

Information as to whether a repeater exists that is connected to a base station is stored in the storage 7 of the terminal. By looking through this information table stored, the terminal determines whether a repeater exists that is connected to a base station located in the vicinity of the terminal (111). If a repeater connected to a transmitting base station exists, there is a possibility that the terminal receives signals from the repeater. The terminal compares the delay (delay time) of signals from the possible repeater and the delay of signals from another base station (signal reception delay from the possible repeater and from another base station, that is, T1 minus T2) (112). If distance obtained by multiplying the signal reception delay (T1 minus T2 etc.) by light velocity for the signals from both is significantly longer than the distance between both base stations, it is determined that the terminal receives signals from the repeater (113). Determining whether the propagation distance is significantly longer than the distance between base stations depends on what intervals at which base stations are installed in the wireless communications system in which the terminal is used. Base stations are normally installed at intervals of several kilometers. Moreover, from the delay measurements in the wireless communications system in practical use (see FIG. 3), it is found that repeater delay occurs as delay equivalent to 12 km that is difference between the distance of the terminal from the repeater obtained from the measured delay time of signals from the repeater and the distance of the terminal from the base station that uses the repeater for transmitting the signals from it. In view hereof, a threshold for determination should be set at, for example, double the average interval between base stations. By comparing the distance obtained from the signal reception delay with the threshold, if the distance obtained from the signal reception delay is less than the threshold, it is determined that the possible repeater is not a repeater (114). This embodiment of the repeater detection method may be modified to determine whether a repeater or a base station from which the terminal receives signals by signal arrival signal reception delay before multiplying the delay by light velocity, not based on distance difference between a base station and its repeater.

In the above-described repeater detection method (FIG. 5), repeater detection is conditioned in the step 111 in which the terminal looks through the information table and determines whether a repeater exists that is connected to a base station in the vicinity of the terminal when determining whether a repeater or a base station from which it receives signals. However, even if such conditioning is excluded, this repeater detection method is effective. That is, even if determination is not made as to possibility of a repeater existing near the terminal, when the delay of signals from a transmitting station is significantly longer than the delay of signals from other base stations, it is obvious that the transmitting station is a repeater. Thus, even if determination in the step 111 is omitted, the repeater detection method illustrated in FIG. 5 remains effective. However, when the terminal is at high place such as the top of a mountain where it can receive radio waves from a far transmitter or when base stations are installed densely and recurrent PN offset signals are transmitted over a short distance, the terminal may receive signals of long delay from a far base station, which may cause an error of positional calculation. When the step 111 is executed and the terminal determines that a possible repeater exists near the terminal, the terminal removes inconsistent measurement and this is also effective for preventing the error that may occur in the above situation.

Another embodiment of the invention will now be described. In the above-described Embodiment 1 (FIG. 4), terminal position calculation is executed without using the measurement of distance of the terminal from the possible repeater. However, when the terminal is very near to a repeater, the terminal receives signals of highly intensive power from the repeater as described above. At this time, automatic gain control (AGC) is activated in the RF unit 2 of the terminal to suppress signals from other base stations and consequently it may be difficult to observe the signals from other base stations. Especially, in closed space such as indoor environment, transmission loss occurs when the signals from other base stations pass through walls, which makes reception of those signals more difficult, greatly affecting the result of observation of the signals from base stations. In this case, it is effective to use a position calculation method in which the terminal position is regarded as the repeater location if the terminal is very near to the repeater.

Figure 6:
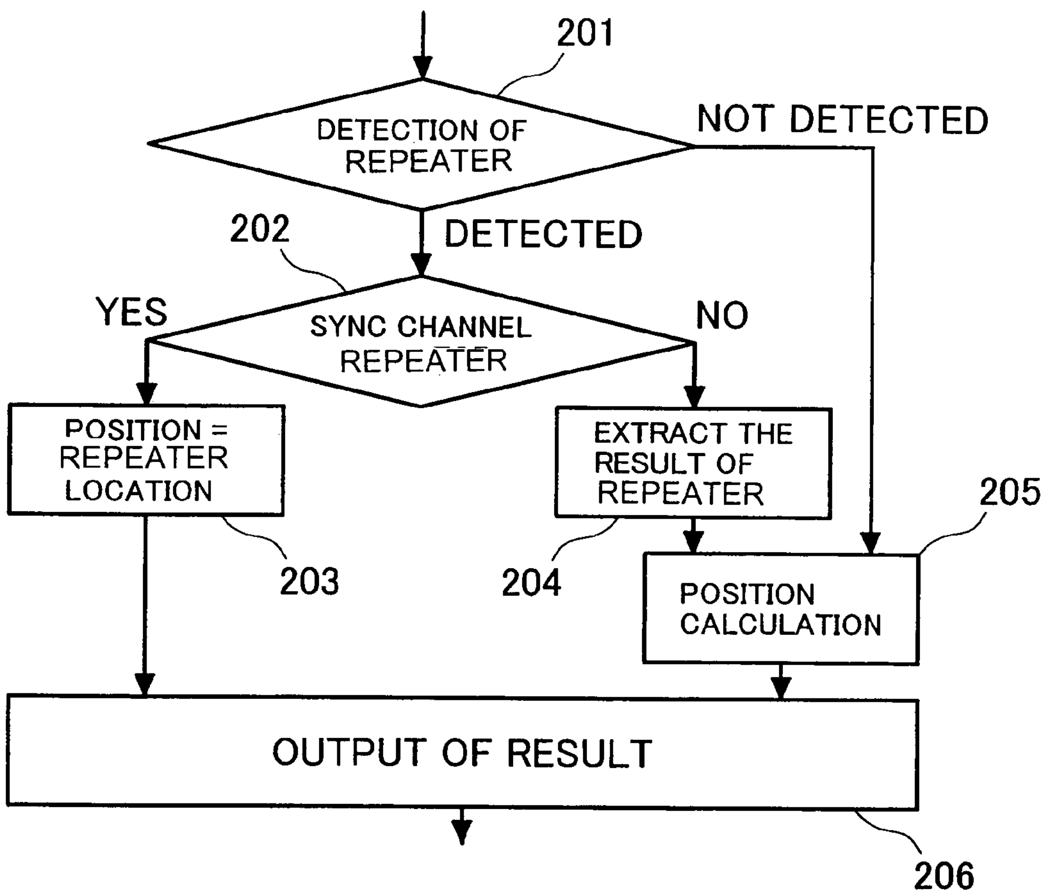
FIG. 6 is a flowchart illustrating another position calculation method of Embodiment 2.

FIG. 6 a flowchart illustrating another position calculation method (Embodiment 2) that is implemented by the wireless communications terminal apparatus of embodiment of the invention.

Based on the measurements of propagation delay time of signals from the base stations in the vicinity of the terminal, the terminal first determines whether signals from a repeater are observed (201). Determining whether the terminal receives signals from a repeater is done by the above-described method illustrated in FIG. 5. If a repeater is detected, the terminal determines whether the repeater is a base station from which it received a sync channel, in other words, whether the base station outputting the most powerful signals received by the terminal is the repeater (202).

If it is determined that the base station transmitting the sync channel is the repeater, the terminal determines the repeater location as its position because the repeater is located very near to the terminal (reception point) (203). If it is determined that the base station transmitting the sync channel is not the repeater, the terminal removes distance measurement obtained as the result of measuring delay time of the signals from the repeater (204) and calculates its position (205). Finally, the terminal position determined through the step 203 or step 205 is output (206).

If no repeater is detected in the step 201, the terminal calculates its position, using distance measurements obtained as the result of measuring delay time of the signals from all base stations in its vicinity (205)

While, in Embodiment 2 described above, the terminal determines whether a repeater exists in its vicinity by the above-described method illustrated in FIG. 5, it can make this determination, using another method, when the repeater is the station transmitting the sync channel.

Figure 7:
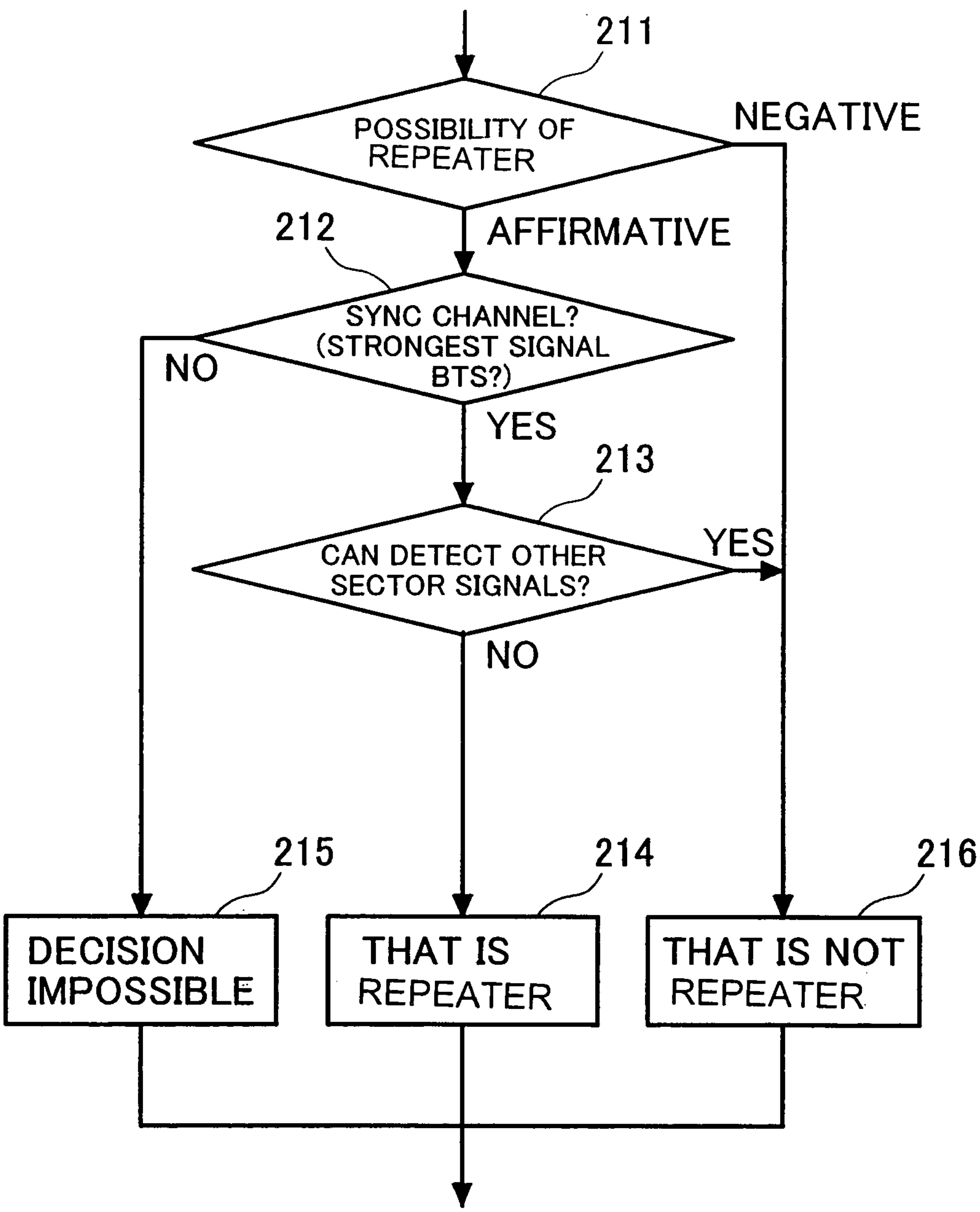
FIG. 7 is a flowchart illustrating another repeater detection method of Embodiment 2.

FIG. 7 is a flowchart illustrating another repeater detection method applicable to Embodiment 2 of the invention.

By looking through a list of repeaters stored in the storage 7 of the terminal, the terminal first determines whether a repeater exists that is connected to a base station located in the vicinity of the terminal (211). If there is no possibility of a repeater existing near the terminal, the terminal determines that the transmitting station is not a repeater.

If there is a possibility of a repeater existing near the terminal, the terminal determines whether the base station transmitting PN offset signals is the one from which it received the sync channel, in other words, whether it is the one transmitting the highest power signals (212). A method of determining whether the station is transmitting the sync channel will be described later, using FIG. 9. If the base station transmitting PN offset signals is the one from which the terminal received the sync channel, the terminal determines whether it can detect other sector signals (213).

If the terminal can observe only the sector of sync channel, it determines that the transmitting station is a repeater (214). If the terminal can observe other sectors, it determines that the transmitting station is not a repeater (216).

If it is determined that the base station transmitting PN offset signals is not the one from which the terminal received the sync channel in the step 212, the terminal cannot determine whether the transmitting station is a repeater by this method (215). In this case where decision is impossible, the method illustrated in FIG. 5 can be used to supplement such decision, and using the described methods in combination is embraced in the range of the invention.

The principle of determining whether a repeater or a base station from which the terminal receives signals by observing the number of sectors it receives will now be described, using FIG. 8.

In order to increase frequency use efficiency, a cellular base station normally transmits signals in sectors of a frequency band, using a directional antenna. Because the FB fractions provided by the antenna are about 20 dB, when the terminal is very near to a base station, it observes a plurality of sectors (for example, 3 sectors), not only one sector. On the other hand, a repeater simply repeats signals in one of the sectors from a base station. When the terminal is very near to a repeater, in most cases, it observes signals in one sector, not in plurality of sectors.

This is also due to AGC (Automatic Gain Control) on the terminal. The terminal is provided with the AGC function that adjusts the input end amplifier to gain constant average power of signals received. When the terminal is very near to a base station or repeater, it receives powerful signals from the station. Consequently, the AGC is activated to reduce the gain of the amplifier, which makes an adjustment of signal power to prevent signal power saturation. Adversely, the receiver sensitivity decreases, and the terminal becomes unable to receive signals of low power. Thus, the terminal becomes unable to receive signals from far base stations. When the terminal is very near to a base station, it receives signals in other sectors satisfactorily because these signals are also sufficiently powerful even if the terminal receiver sensitivity decreases. On the other hand, when the terminal is very near to a repeater, it receives dominant signals in one sector because the repeater repeats signals in only one sector, which causes the AGC to operate. Signals in other sectors from a far station become hard to be received by the terminal in the condition that the receiver sensitivity decreases.

Taking advantage of the above receiving characteristics of the terminal, the terminal detects a repeater in the step 213 in FIG. 7 by determining whether it can detect signals in other sectors from the transmitting station.

Figure 8:
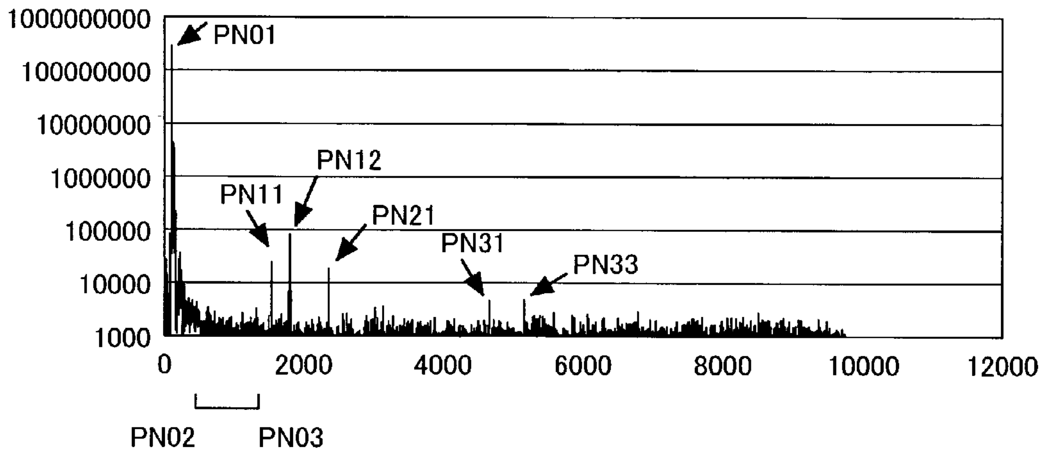
FIG. 8 is a graph of delay profiles of measured pilot signals from base stations and a repeater in the vicinity of the terminal when the terminal is very near to the repeater.

FIG. 8 is a graph of delay profiles of measured pilot signals from base stations and a repeater in the vicinity of the terminal when the terminal is very near to the repeater. In this chart, delay time increases along the abscissa, that is, a signal plotted nearer to the right end is of longer delay. The power intensity of a signal received at the delay time is plotted along the ordinate. In the vicinity of the terminal location of measurement, there are four base stations: base station 0 transmitting signals in sectors PN01, PN02, and PN03; base station 1 transmitting signals in sectors PN11, PN22, and PN13, base station 2 transmitting signals in sectors PN21; PN22, and PN23, and base stations 4 transmitting signals in sectors PN31; PN32, and PN33. At the point of observation, the terminal receives pilot signals from these base stations, the pilot signals being offset in accordance with the pilot PN offset predetermined for each base station.

In the chart, apparent peaks of six sector signals PN01, PN11, PN12, PN21, PN31, and PN33 can be observed. A base station outputting the highest signal power is the one transmitting PN01, PN02, and PN03 sector signals. However, only the PN01 signal can be observed and the remaining PN02 and PN03 signals cannot be observed. This phenomenon is characteristic of reception of signals from a repeater as described above. Thus, it can be determined that the base station 0 from which the terminal receives only the PN01 sector signal is a repeater.

Figure 9:
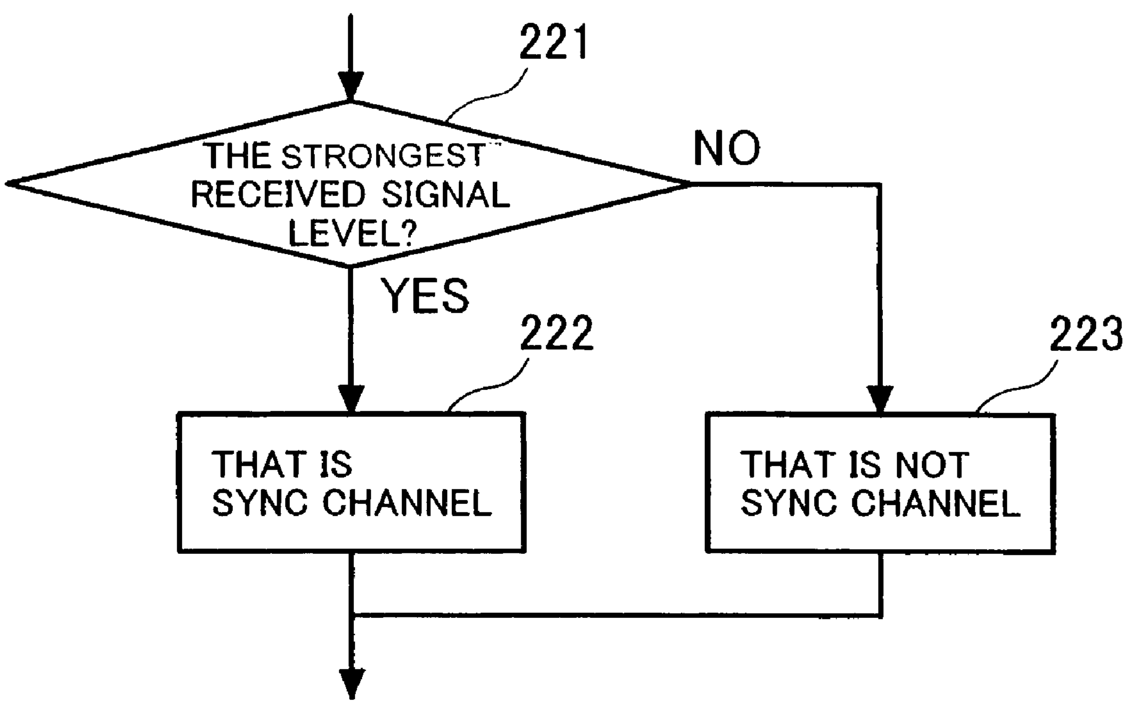
FIG. 9 is a flowchart illustrating a sync channel detection method of Embodiment 2.

FIG. 9 is a flowchart illustrating a sync channel detection method which is applied to the repeater detection method (FIG. 7) of embodiment of the invention.

As described above, a feature of the sync channel is the highest power signal received. Thus, the terminal first compares the signal power received from the station and the signal level received from other stations and determines whether the most powerful signal is received from the station (221). The terminal determines that the station is transmitting the sync channel if the most powerful signal is received from the station (222). If not, the terminal determines that the station is not transmitting the sync channel (223).

Figure 10:
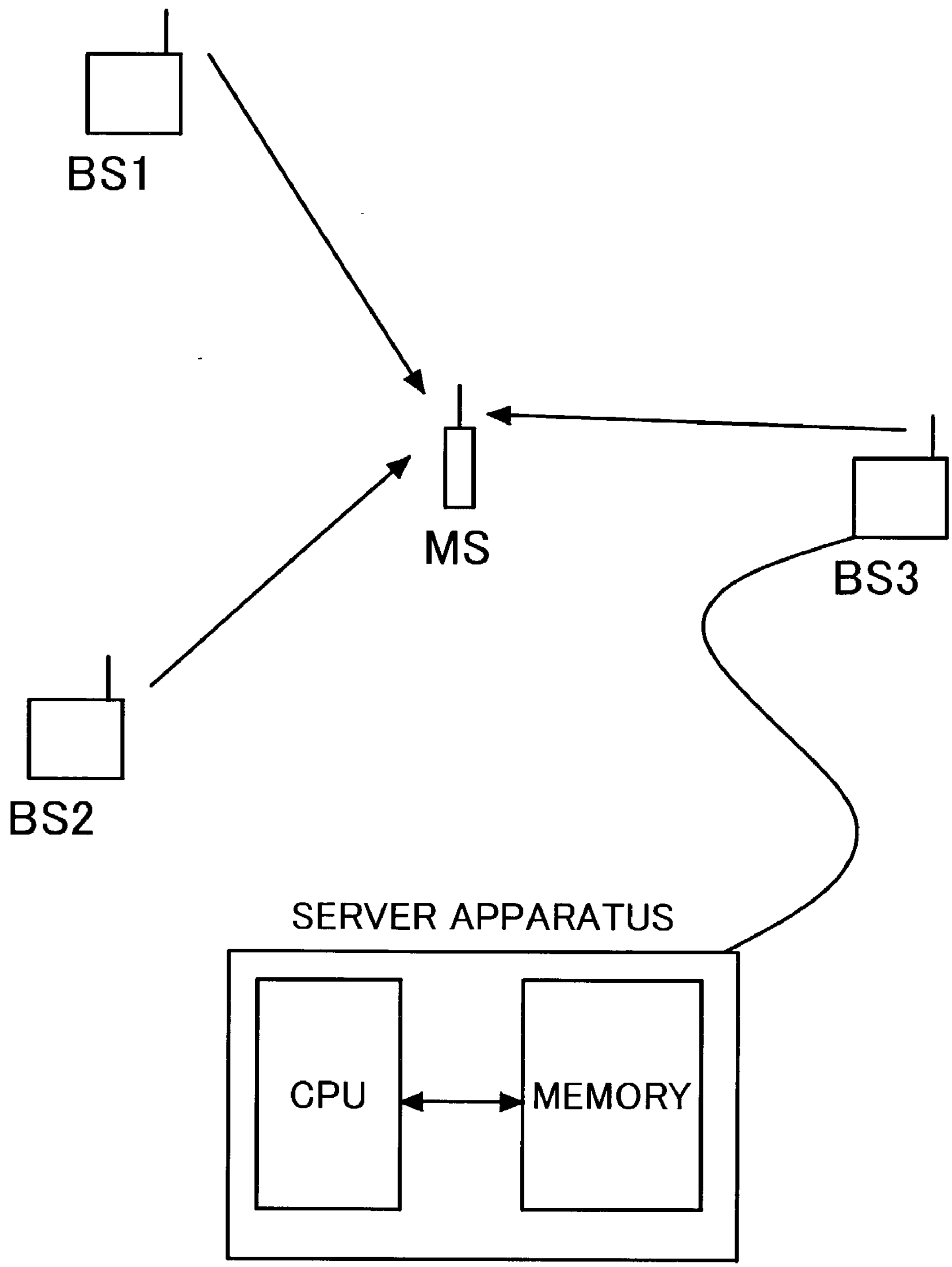
FIG. 10 is a block diagram showing the configuration of a system for determining wireless terminal position according to a preferred embodiment of the present invention.

FIG. 10 is a block diagram showing the configuration of a system for determining wireless terminal position.

While, in the above-described embodiment, the information table used for the terminal to determine whether a repeater exists that is connected to a base station is stored in the storage 7 of the terminal, a system can be configured so that the terminal can use such information stored into a database outside the terminal.

In the system for determining wireless terminal position shown in FIG. 10, the list of base stations and associated repeaters is stored on a server apparatus connected to the wireless communications network. The terminal sends a base station ID received from a base station nearest to it to the server via a base station BS3. The server searches out the base station ID that the terminal received, retrieves the IDs of its neighboring base stations, their PN offsets, and locations from the information table, and sends back them to the terminal. Using the information provided by the server, the terminal observes the base stations and the PN offset signals transmitted from them. Using the distance measurements obtained from the observed signals, the terminal carries out the repeater detection method of the above-described embodiment.

In this case, the terminal may calculate its position. Instead, it is also preferable to send the distance measurements of the terminal and the base stations in its vicinity, calculated from the delay profiles to the server via the wireless communications network so that the server will calculate the terminal position.

According to other aspects of the invention than claimed, typical embodiments of the invention are enumerated below.

(1) A wireless communications terminal apparatus in which the storage means stores the identifiers of base stations with an indicator per base station indicating whether a repeater is connected to the base station as base stations information.

(2) A system for determining terminal position in which repeater detection means compares timing of receiving a signal from a radio station and timing of receiving a signal from another radio station and determines that the radio station is a repeater, based on the result of the comparison (for example, when the timing of receiving the signal from the radio station is later than the timing of receiving the signal from another radio station by a predetermined time and longer).

(3) A system for determining terminal position in which, when the terminal can observe signals only in a predetermined number of sectors from one of the radio stations, the repeater detection means determines that the one of the radio stations is a repeater.

(4) A system for determining terminal position in which the repeater detection means determines whether a signal having the maximum power or amplitude among the received signals was received from a repeater.

(5) A system for determining terminal position including storage means for storing information as to whether a repeater exists that is connected to a radio station, wherein the repeater detection means determines whether there is a possibility of receiving signals from a repeater, using repeater-related information stored in the storage means, and detects a repeater if there is a possibility of receiving signals from a repeater.

(6) A position calculation method including the repeater detection step which comprises the step of determining whether a signal having the maximum power or amplitude among the received signals was received from a repeater.

(7) A position calculation method including the repeater detection step which comprises the steps of determining whether there is a possibility of receiving signals from a repeater, using information as to whether a repeater exists that is connected to a radio station, which was stored in the storage means, and detecting a repeater if there is a possibility of receiving signals from a repeater.

(8) A position calculation method including the repeater detection step which comprises the steps of obtaining repeater-related information stored in storage facilities connected to a wireless communications network from the storage facilities, determining whether there is a possibility of receiving signals from a repeater, using the thus obtained information, and detecting a repeater if there is a possibility of receiving signals from a repeater.

(9) A position calculation method including a reception timing measuring step for receiving a signal transmitted from a radio station and measuring its reception timing and a reception timing sending step for sending the measured reception timing to a server apparatus connected to the wireless communications network via a wireless communication line and the repeater detection step which comprises the step of determining whether a repeater exists that is connected to the radio station that transmitted the signal received, based on its reception timing which was sent to the server.

(10) A server apparatus in which the repeater detection means compares timing of receiving a signal from a radio station and timing of receiving a signal from another radio station and determines that the radio station is a repeater, based on the result of the comparison (for example, when the timing of receiving the signal from the radio station is later than the timing of receiving the signal from another radio station by a predetermined time and longer).

(11) A server apparatus in which, when the terminal can observe signals only in a predetermined number of sectors from one of the radio stations, the repeater detection means determines that the one of the radio stations is a repeater.

(12) A server apparatus in which the repeater detection means determines whether a signal having the maximum power or amplitude among the received signals was received from a repeater.

(13) A server apparatus including storage means for storing information as to whether a repeater exists that is connected to a radio station, wherein the repeater detection means determines whether there is a possibility of receiving signals from a repeater, using repeater-related information stored in the storage means, and detects a repeater if there is a possibility of receiving signals from a repeater.

(14) A server apparatus in which the storage means stores the identifiers of base stations with an indicator per base station indicating whether a repeater is connected to the base station as base stations information.

(15) An apparatus fabricated with semiconductor integrated circuits on which the repeater detection step is executed, the repeater detection step comprising the steps of comparing timing of receiving a signal from a radio station and timing of receiving a signal from another radio station and determining that the radio station is a repeater, based on the result of the comparison (for example, when the timing of receiving the signal from the radio station is later than the timing of receiving the signal from another radio station by a predetermined time and longer).

(16) An apparatus fabricated with semiconductor integrated circuits on which the repeater detection step is executed, wherein, when the terminal can observe signals only in a predetermined number of sectors from one of the radio stations, the repeater detection step determines that the one of the radio stations is a repeater.

(17) An apparatus fabricated with semiconductor integrated circuits on which the repeater detection step is executed to determine whether a signal having the maximum power or amplitude among the received signals was received from a repeater.

(18) An apparatus fabricated with semiconductor integrated circuits on which the repeater detection step is executed to determine whether there is a possibility of receiving signals from a repeater, using information as to whether a repeater exists that is connected to a radio station, stored in the storage means, and detect a repeater if there is a possibility of receiving signals from a repeater.

(19) An apparatus fabricated with semiconductor integrated circuits on which the repeater detection step is executed, the repeater detection step comprising the steps of obtaining repeater-related information stored in storage facilities connected to a wireless communications network from the storage facilities, determining whether there is a possibility of receiving signals from a repeater, using the thus obtained information, and detecting a repeater if there is a possibility of receiving signals from a repeater.

(20) An apparatus fabricated with semiconductor integrated circuits on which a reception timing measuring step for receiving a signal transmitted from a radio station and measuring its reception timing and a reception timing sending step for sending the measured reception timing to a server apparatus connected to the wireless communications network via a wireless communication line are executed together with the repeater detection step which comprises the step of determining whether a repeater exists that is connected to the radio station that transmitted the signal, based on its reception timing which was sent to the server.

What is claimed is:

1. A wireless communications terminal apparatus which receives signals transmitted from a plurality of radio stations and calculates its position, using the received signals, comprising:

repeater detection means for detecting a signal from a repeater which transmits signals that are generated on the basis of signals transmitted from one of the radio stations and indistinguishable from the signals transmitted from the one of the radio stations from among said received signals; and position calculation means for calculating the position of the terminal apparatus, wherein, when said repeater detection means has detected a signal from a repeater, said position calculation means ignores the detected signal from the repeater and calculates the position of the terminal apparatus, using the received signals from other radio stations, and wherein said repeater detection means compares a distance corresponding to signal reception delay timing of receiving a signal from one of said radio stations and timing of receiving a signal from another one of said radio stations and a distance of said one of said radio stations and said another one of said radio stations, and determines whether said one of said radio stations is said repeater, based on the result of the comparison.

2. A wireless communications terminal apparatus as claimed in claim 1, wherein said terminal apparatus is connected to a wireless communications network including storage facilities for storing information as to whether a repeater exists that is connected to each of said radio stations, and said repeater detection means obtains repeater-related information stored in said storage facilities from said storage facilities via a wireless communications network, determines whether there is a possibility of receiving signals from a repeater, using the thus obtained information, and detects said repeater if there is a possibility of receiving signals from a repeater.

3. A wireless communications terminal apparatus as claimed in claim 1, further comprising:

reception timing measuring means for receiving a signal transmitted from one of said radio stations and measuring its reception timing; and reception timing sending means for sending the measured reception timing to a server apparatus connected to a wireless communications network via a wireless communication line so that the server apparatus will determine whether a repeater exists that is connected to the radio station that transmitted the signal received.

4. A wireless communications terminal apparatus which receives signals transmitted from a plurality of radio stations and calculates its position, using the received signals, comprising:

repeater detection means for detecting a signal from a repeater which transmits signals that are generated on the basis of signals transmitted from one of the radio stations and indistinguishable from the signals transmitted from the one of the radio stations from among said received signals; and position calculation means for calculating the position of the terminal apparatus, wherein, when said repeater detection means has detected a signal from a repeater, said position calculation means determines the location of the repeater transmitting the detected signal as the position of the terminal apparatus.

5. A wireless communications terminal apparatus as claimed in claim 1, wherein, when the terminal apparatus can observe signals only in a predetermined number of sectors from one of said radio stations, said repeater detection means determines that the one of said radio stations is a repeater.

6. A wireless communications terminal apparatus as claimed in claim 5, wherein said repeater detection means determines whether a signal having the maximum power or amplitude among the received signals was received from a repeater.

7. A wireless communications terminal apparatus as claimed in claim 1, further comprising storage means for storing information as to whether a repeater exists that is connected to each of said radio stations, wherein said repeater detection means determines whether there is a possibility of receiving signals from a repeater, using repeater-related information stored in said storage means, and detects said repeater if there is a possibility of receiving signals from a repeater.

8. A system for determining terminal position, comprising:

radio stations which transmit signals to a wireless communications terminal apparatus;

a repeater which transmits signals that are generated on the basis of signals transmitted from one of the radio stations and indistinguishable from the signals transmitted from the one of the radio stations; and a wireless communications terminal apparatus which receives signals from a plurality of radio stations for calculating its position, using the received signals, said system further comprising:

repeater detection means for detecting a signal from said repeater from among said received signals; and position calculation means for calculating the position of the terminal apparatus, wherein, when said repeater detection means has detected a signal from a repeater, said position calculation means ignores the detected signal from the repeater and calculates the position of the terminal apparatus, using the received signals from other radio stations, and wherein said repeater detection means compares a distance corresponding to signal reception delay timing of receiving a signal from one of said radio stations and timing of receiving a signal from another one of said radio stations and a distance of said one of said radio stations and said another one of said radio stations, and determines whether said one of said radio stations is said repeater, based on the result of the comparison.

9. A system for determining terminal position as claimed in claim 8, further comprising storage facilities for storing information as to whether a repeater exists that is connected to each of said radio stations, wherein said repeater detection means obtains repeater-related information stored in said storage facilities from said storage facilities via a wireless communications network, determines whether there is a possibility of receiving signals from a repeater, using the thus obtained information, and detects said repeater if there is a possibility of receiving signals from a repeater.

10. A system for determining terminal position as claimed in claim 8, further comprising:

reception timing measuring means for receiving a signal transmitted from one of said radio stations and measuring its reception timing; and reception timing sending means for sending the measured reception timing to a server apparatus connected to a wireless communications network via a wireless communication line so that the server apparatus will determine whether a repeater exists that is connected to the radio station that transmitted the signal received.

11. A system for determining terminal position, comprising:

radio stations which transmit signals to a wireless communications terminal apparatus;

a repeater which transmits signals that are generated on the basis of signals transmitted from one of the radio stations and indistinguishable from the signals transmitted from the one of the radio stations; and a wireless communications terminal apparatus which receives signals from a plurality of radio stations for calculating its position, using the received signals, said system further comprising:

repeater detection means for detecting a signal from said repeater from among said received signals; and position calculation means for calculating the position of the terminal apparatus, wherein, when said repeater detection means has detected a signal from a repeater, said position calculation means determines the location of the repeater transmitting the detected signal as the position of the terminal apparatus.

12. A position calculation method by which a wireless communications terminal apparatus receives signals transmitted from a plurality of radio stations and calculates its position, using the received signals, said position calculation method comprising:

a repeater detection step for detecting a signal from a repeater which transmits signals that are generated on the basis of signals transmitted from one of the radio stations and indistinguishable from the signals transmitted from the one of the radio stations from among said received signals; and a position calculation step for calculating the position of the terminal apparatus, wherein, when a signal from a repeater has been detected by said repeater detection step, the detected signal from the repeater is ignored and the position of the terminal apparatus is calculated by using the received signals from other radio stations in said position calculation step, and wherein said repeater detection step compares a distance corresponding to signal reception delay timing of receiving a signal from one of said radio stations and timing of receiving a signal from another one of said radio stations and a distance of said one of said radio stations and said another one of said radio stations, and determines whether said one of said radio stations is said repeater, based on the result of the comparison.

13. A position calculation method as claimed in claim 12, wherein, when the terminal apparatus can observe signals only in a predetermined number of sectors from one of said radio stations, said repeater detection step determines that the one of said radio stations is a repeater.

14. A position calculation method by which a wireless communications terminal apparatus receives signals transmitted from a plurality of radio stations and calculates its position, using the received signals, said position calculation method comprising:

a repeater detection step for detecting a signal from a repeater which transmits signals that are generated on the basis of signals transmitted from one of the radio stations and indistinguishable from the signals transmitted from the one of the radio stations from among said received signals; and a position calculation step for calculating the position of the terminal apparatus, wherein, when a signal from a repeater has been detected by said repeater detection step, the location of the repeater transmitting the detected signal is determined as the position of the terminal apparatus in said position calculation step.

15. A server apparatus which calculates the position of a wireless communications terminal apparatus which received signals from a plurality of radio stations, said server apparatus comprising:

position calculation means for calculating the position of the terminal apparatus, based on timing when said wireless communications terminal apparatus received the signals; and repeater detection means for detecting a signal from a repeater which transmits signals that are generated on the basis of signals transmitted from one of the radio stations and indistinguishable from the signals transmitted from the one of the radio stations from among said received signals;

wherein, when said repeater detection means has detected a signal from a repeater, said position calculation means ignores the detected signal from the repeater and calculates the position of the terminal apparatus, using the received signals from other radio stations, and wherein said repeater detection means compares a distance corresponding to signal reception delay timing of receiving a signal from one of said radio stations and timing of receiving a signal from another one of said radio stations and a distance of said one of said radio stations and said another one of said radio stations, and determines whether said one of said radio stations is said repeater, based on the result of the comparison.

16. A server apparatus which calculates the position of a wireless communications terminal apparatus which received signals from a plurality of radio stations, said server apparatus comprising:

position calculation means for calculating the position of the terminal apparatus, based on timing when said wireless communications terminal apparatus received the signals; and repeater detection means for detecting a signal from a repeater which transmits signals that are generated on the basis of signals transmitted from one of the radio stations and indistinguishable from the signals transmitted from the one of the radio stations from among said received signals;

wherein, when said repeater detection means has detected a signal from a repeater, said position calculation means determines the location of the repeater transmitting the detected signal as the position of the terminal apparatus.

17. An apparatus fabricated with semiconductor integrated circuits having a memory into which a program can be stored and a CPU, wherein a computer-executable program is stored into said memory and said CPU executes said program stored and retained in said memory, said program comprising:

a repeater detection step for detecting a signal from a repeater which transmits signals that are based on signals transmitted from one of the radio stations and indistinguishable from the signals transmitted from the one of the radio stations from among said received signals; and a position calculation step for calculating the position of the terminal apparatus, wherein, when a signal from a repeater has been detected by said repeater detection step, the detected signal from the repeater is ignored and the position of the terminal apparatus is calculated by using the received signals from other radio stations in said position calculation step, and wherein said repeater detection step compares a distance corresponding to signal reception delay timing of receiving a signal from one of said radio stations and timing of receiving a signal from another one of said radio stations and a distance of said one of said radio stations and said another one of said radio stations, and determines whether said one of said radio stations is said repeater, based on the result of the comparison.

18. An apparatus fabricated with semiconductor integrated circuits having a memory into which a program can be stored and a CPU, wherein a computer-executable program is stored into said memory and said CPU executes said program stored and retained in said memory, said program comprising:

a repeater detection step for detecting a signal from a repeater which transmits signals that are generated on the basis of signals transmitted from one of the radio stations and indistinguishable from the signals transmitted from the one of the radio stations from among said received signals; and a position calculation step for calculating the position of the terminal apparatus, wherein, when a signal from a repeater has been detected by said repeater detection step, the location of the repeater transmitting the detected signal is determined as the position of the terminal apparatus in said position calculation step.

* * * * *